Dec. 18, 1962   A. A. ROGERS ETAL   3,069,210
PISTON MOUNTING MEANS
Filed Oct. 17, 1960   2 Sheets-Sheet 1

INVENTOR.
ARGEL A. ROGERS
LESTER B. ROGERS
BY
ATTORNEY

United States Patent Office 3,069,210
Patented Dec. 18, 1962

3,069,210
PISTON MOUNTING MEANS
Argel A. Rogers and Lester B. Rogers, both of 427 W. 58th St., South Wichita 17, Kans.
Filed Oct. 17, 1960, Ser. No. 62,932
3 Claims. (Cl. 309—19)

This invention relates to pistons, and more particularly to mounting means for pistons in an internal combustion engine. Still more particularly, the invention relates to a piston and means for mounting same on a connecting rod. Still more particularly, the invention relates to a construction for pistons whereby a ball and socket type mounting can be provided for the piston and a connecting rod.

Various constructions for pistons and provisions for mounting same on connecting rods are known in the prior art. These include some universal type mountings for pistons. The prior art mounting means, particularly where universal type mountings are concerned, require detailed and complicated structures for the piston and the clamping means for securing same to the connecting rod. These prior art mounting means due to their complicated structure and resultant expense have failed to provide the art with any practical and usable universal type mounting means. Also, means for dissipation heat generated in operation have not been provided. Where universal type mounting means are not used, the piston is normally secured to the connecting rod by a pin passing through the rod and the piston. In use, the pin causes the piston to wear unevenly, requiring machining and reshaping of the piston, particularly in the area of the pin, also, these mountings cannot tolerate end play often present. These and other deficiencies of the prior art structures dictate the need for new and improved mounting means for piston in high performance internal combustion engines in order to reduce manufacturing problems and maintainence costs.

In accordance with the present invention new mounting means are provided particularly adapted for use with a piston to mount it on a connecting rod in internal combustion engines. The mounting means of the invention is of the ball and socket type and in the preferred constructions thereof, the complicated structure present in the prior art devices has been eliminated. Also, relatively simple clamp means have been provided which can be positively aligned on the piston to provide a continuous socket surface to receive the end of the connecting rod. In one preferred specific embodiment of the invention the connecting rod is provided with a spherical end which is received in the socket. In another preferred specific embodiment of the invention the connecting rod is provided with a generally cylindrical pin on the end thereof which is received in a shaped recess or socket in the piston. Means are also provided in the present invention to dissipate heat generated during operation. Also, means are preferably provided in the preferred embodiments of the invention so that perfect balancing can be obtained relatively easily to thereby improve performance of the engine.

The mounting means of the invention is preferably used with a piston in an internal combustion engine. The piston is desirably hollow at one end and has a recess formed therein. Clamp means are provided and are mounted on the piston so that the recess, together with the clamp means provides a socket or recess which is contoured to closely surround the end portion of a connecting rod. In one preferred specific embodiment of the invention, the recess formed is spherical and receives a spherical ball on the end of the connecting rod. In another preferred specific embodiment of the invention the recess formed is elongated and generally cylindrical and receives a pin on the end of the connecting rod. A plurality of ribs are preferably formed on the surface of the piston to provide for heat dissipation. The rib structure can also be utilized to provide perfect balancing of the piston and improved performance thereof. Preferably, means are provided on the piston and on the clamp means to provide accurate alignment of the clamps when positioned on the piston.

Accordingly, it is an object of this invention to provide new mounting means for a piston.

Another object of the invention is to provide new mounting means for a piston which eliminates uneven wear on the pistons.

A further object of the invention is to provide a new construction for a piston to facilitate the mounting of a connecting rod thereto and to increase the heat dissipation from the piston.

A still further object of the invention is to provide a new mounting for a piston on a connecting rod wherein positive alignment is obtained between the piston and the clamp means securing the connecting rod thereto.

Another object of the invention is to provide a piston mounting means which is not affected by end play of the crank shaft.

A still further object of the invention is to provide a relatively simple ball and socket type mounting means for pistons and the like.

Various other objects, advantages and features of the invention will become apparent from the following description taken in connection with the accompanying drawings, in which.

Figure 1:
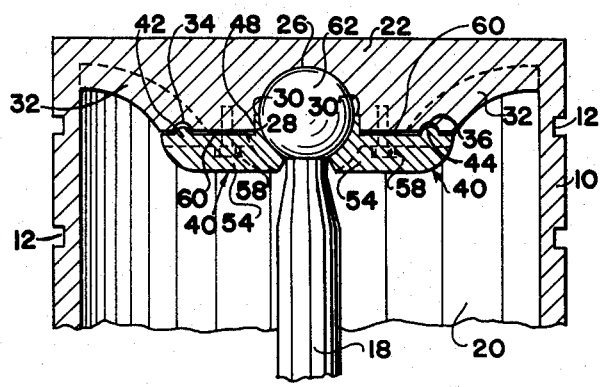
FIG. 1 is a partial cross section view through a piston showing one preferred specific embodiment of the mounting means of the invention.

The following is a discussion and description of preferred specific embodiments of the new piston and mounting means therefor of the invention, such being made with reference to the drawings whereon the same reference numerals are used to indicate the same or similar parts and/or structure. It is to be understood that such discussion and description is not to unduly limit the scope of the invention.

Figure 2:
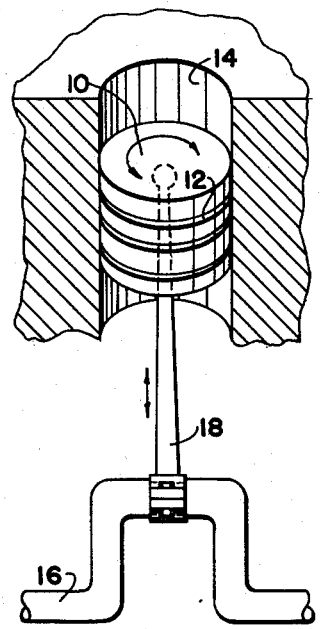
FIG. 2 is an isometric view showing the piston in operation in an internal combustion engine.

Referring now to the drawings in detail, FIGS. 1 and 2 show a piston 10 which is cylindrical in the usual case and has ribs or grooves 12 formed in the outer surface thereof to receive piston rings (not shown) in the usual manner. Piston 10 is received in a cylinder 14, such as the cylinder in an internal combustion engine. A crank shaft 16 of the usual construction carries a connecting rod 18, crank shaft 16 being driven by the movement of connecting rod 18 as piston 10 moves in cylinder 14.

The piston 10 is preferably hollow as shown at 20 at one end and is closed as shown at 22 at the other end. The closed end 22 of the piston 10 preferably has on the inside surface thereof an integrally formed elongated socket mounting means shown generally at 24. The socket mounting means 24 has a centrally located recess 26 which is also centrally located in relation to the entire piston 10. The recess 26 in the embodiment shown in FIGS. 1–5 is preferably shaped so as to define a semi-spherical inner space. Recess 26 can be smoothly polished so as to provide a relatively friction free surface and can be lubricated, if desired, in any suitable manner.

A circular mouth 28 is formed in the socket mounting means 24 around the edge of the recess 26. The mouth 28 is somewhat larger in diameter than the recess 26, and the recess and mouth are joined by a circular ledge 30.

A plurality of ribs 32 are preferably formed on the inside surface of the closed end 22 of the piston 10. The ribs 32 are preferably radially extending and equally spaced around the inner surface of the piston 10. The ribs 32 perform a dual function in that they dissipate the heat generated by the movement of the piston 10 within the cylinder 14 or due to the firing in the combustion chamber of the engine, and the ribs also provide a plurality of supporting members which increase the strength of the piston and permit relatively thin walls at the closed end 22 of the piston. The ribs 32 also permit perfect balancing to be obtained for the piston 10, thereby substantially increasing the performance of the piston. The balancing is obtained by drilling or otherwise removing material from the ribs in the areas where the piston is heavy, or by securing weights and the like to the ribs in the area where the piston is light. The provision of the ribs to permit perfect balancing provides a piston which can be used in high perforance engines with a minimum of wear and maintenance.

Figure 3:
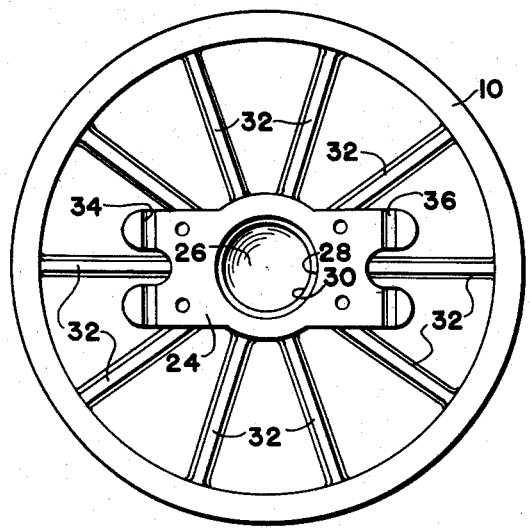
FIG. 3 is an inside plan view of the piston shown in FIG. 1 with the clamps and connecting rod removed.

The socket mounting means 24 preferably has two elongated and transversely extending grooves 34 and 36 formed therein at opposite sides of the recess 26. The grooves 34 and 36 are shown in FIG. 3 as being interrupted by the ribs 32, however if desired the socket mounting means can extend through these ribs to provide for continuous grooves 34 and 36. The grooves 34 and 36 are equally spaced from the recess 26 and are preferably parallel to each other and arcuate in cross section.

Clamp means are provided to secure the end of the connecting rod 18 on the piston 10. Preferably, two such mounting or clamp means are provided and are mounted on the piston 10 in mirror image relation to maintain the connecting rod 18 in position.

Figure 4:
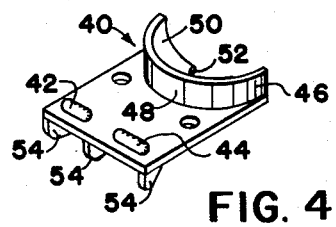
FIG. 4 is an isometric view of a preferred specific embodiment of the clamp means used in the invention.
Figure 5:
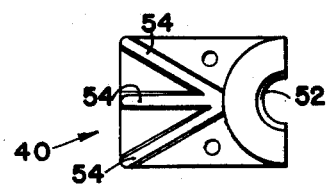
FIG. 5 is a plan view of the clamp means shown in FIG. 4.

A preferred construmction of the clamp means is shown in FIGS. 1, 4 and 5. The clamp means is shown generally at 40 and is generally elongated and rectangular in shape. The clamp 40 has on one surface thereof two elongated and transversely extending rocker blocks 42 and 44. The rocker blocks 42 and 44 are preferably arcuate in cross section and equal in height and dimensioned so as to be received in the grooves 34 or 36 of the piston. The rocker blocks 42 and 44 are preferably positioned near one edge of the clamp and are spaced end to end as best seen in FIG. 4.

On the other or opposite edge of the same surface of the clamp 40 a projecting portion 46 is provided. The projecting portion 46 is preferably semi-cylindrical on the outer surface as shown at 48 and on the inner surface it defines a portion of a sphere as shown at 50. The spherical portion 50 is approximately a quadrant of a sphere and it can extend below the upper surface of the rocker block 40. A semi-circular notch 52 is removed from the edge of the clamp means 40 and is centrally located so as to be within the center of the spherical portion 50. The other face of the clamp 40 is best seen in FIG. 5 and is preferably provided with a plurality of ribs 54 which provide for reinforcement and also for heat dissipation.

In use, two of the clamps 40 are provided and they are mounted on the socket mounting means 24 so that the rocker block 42 and 44 are received in the recesses 34 and 36. Mounting bolts, such as that shown at 58 can be used to mount the clamp means 40. The mounting bolts 58 are preferably of the type which can be locked in position or used in connection with suitable lock washers. Preferably, hexagonal headed safety wire bolts of common construction are used. The clamp means 40 are mounted in mirror image relation so that the spherical portion 50 of each clamp faces inwardly toward the recess 26.

Spacing shim 60 can be used, if desired, to provide the necessary spacing between the piston 10 and the clamp means 40. When mounted, the cylindrical portion 48 of clamp 40 is received in the enlarged circular mouth 28 in the piston with the outer edge of the cylindrical portion 48 being received by the ledge 30. The clamp means 40 and recess 26 are dimensioned relative to each other so that the spherical surface 50 of the clamp means forms a continuation of the recess 26 in the piston 10. The two clamp means will abut on their edges so that the spherical portion 50 of the clamps 40 will be continuous from clamp to clamp with the exception of an opening formed by notches 52.

A substantially spherical space is thus formed by the recess in the piston 10 and the spherical portion of the clamps 40, and a spherical end 62 on the connecting rod 18 can be received in the recess thus formed with the connecting rod 18 projecting therefrom through the opening formed by the notches 52. Preferably, the notches 52 are dimensioned relative to the stem portion of the connecting rod 18 so that some movement of the connecting rod within the recess will be permitted.

The piston mounting as described hereinbefore not only permits movement as the connecting rod 18 rotates with the crank shaft 16, but end play or longitudinal movement of the crank shaft 16 will not be detrimental to the mounting or connection between the piston and the connecting rod since the ball and socket type mounting can move in any direction without placing undue strain on the members at the point of connection. Furthermore, the piston 10 can rotate during operation, thus eliminating the usual localized wear. Also, by dispensing with the usual mounting pin passing through the piston and connecting rod, the areas of uneven wear which usually surround the mounting pin have been eliminated, thus extending the useful life of the device and preventing unnecessary maintenance. Balance of the piston can be initially obtained and adjusted as necessary during wear by the addition of weights to the ribs 32 and/or the removal of metal along the ribs. The additional strength provided by the ribs 32 permits a relatively thin wall at the end of the piston.

FIGS. 6–9 show another preferred specific embodiment of the mounting means for pistons of the invention. In this embodiment, a piston 70 is closed at one end as shown at 72 and is preferably hollow at the other end portion as shown at 74. The piston 70 has the usual grooves 76 to receive piston rings. A connecting rod 78 connects the piston 70 with the crank shaft (not shown).

Figure 6:
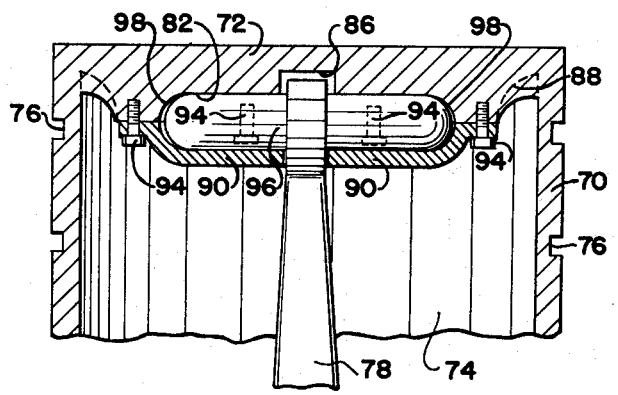
FIG. 6 is a partial cross section view showing another preferred specific embodiment of the mounting means of the invention.
Figure 8:
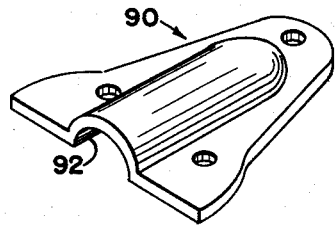
FIG. 8 is an isometric view of the clamp used in the embodiment shown in FIG. 6.
Figure 7:
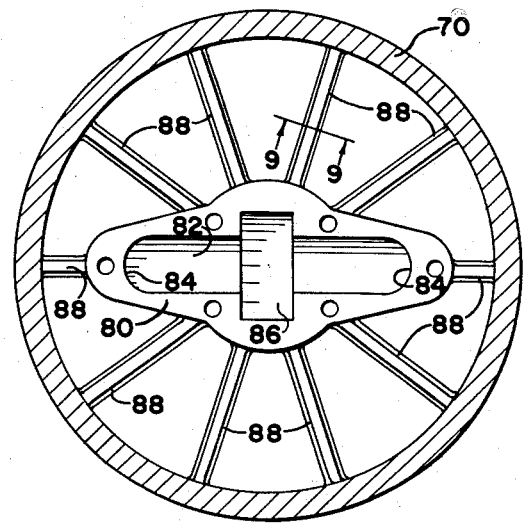
FIG. 7 is an inside plan view of the piston shown in FIG. 6 with the clamp means and connecting rod removed.
Figure 9:
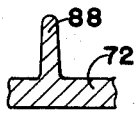
FIG. 9 is an enlarged partial cross section view taken along the line 9—9 of FIG. 7.

The closed end 72 of the piston 70 has on the inside surface thereof an integrally formed socket mounting means 80, FIG. 7. The socket mounting means 80 is preferably elongated as shown in FIG. 7 and has an elongated centrally located recess 82 formed therein. The recess 82 defines a generally semi-cylindrical recess with the ends thereof preferably being rounded as shown at 84, the rounded ends 84 having a radius approximately equal to the radius of the semi-cylindrical space formed by the recess 82. The center portion of the socket mounting means 80 and of the recess 82 has a large semi-cylindrical recess 86 formed therein. The recess 86 is preferably at the longitudinal center of the recess 82 and is larger in radius and substantially shorter. Recess 86 is coaxial with recess 82. The recess 86 receives the upper end of connecting rod 78 as best seen in FIG. 6.

The inside surface of the closed end 72 of piston 70 preferably has a plurality of radially extending and equally spaced ribs 88 formed thereon. The ribs 88, as in the previously described embodiment, provide support for the relatively thin closed end 72 of piston 70 and they readily dissipate any heat transmitted to the piston due to firing of the engine or friction. Ribs 88 further provide means for adjusting or balancing of the piston by removal of metal in the area of the ribs or by attachments of weights and the like thereto.

Suitable clamp means, shown generally at 90 are provided. The clamp 90 is preferably a generally elongated member shaped to conform to one end portion of the socket mounting surface 80. An elongated generally semi-cylindrical recess 92 is provided in the clamp means 90, the recess 92 being of the same radius as recess 82 in the end of the piston 70, and the end portion of the recess 92 being rounded in the same manner as shown at 84 for the recess 82. Suitable mounting means, such as the hexagonal headed bolts 94, preferably adapted to use safety wire, are provided to mount the clamp means 90 onto the end 72 of the piston. Two of the clamp means 90 are used as shown in FIG. 6 and when so mounted form, together with the recess 82, a substantially cylindrical recess or space. The recess or space formed by the clamp means and the recess 82 receives an elongated generally cylindrical pin 96 which passes through the end of the connecting rod 78 and is secured thereto in any suitable manner, such as by a press fit. Pin 96 preferably substantially fills the recess or space created by the recess 82 and the recess 92. Desirably, some space is left at the rounded ends of the pin 96, as shown at 98, so as to permit a certain amount of end play in the crank shaft.

While the clamp means 90 is shown as having generally plain exterior surfaces, structures such as a rocker block 42 and ribs 54 shown in connection with the clamp 40 of the previously described embodiment can also be provided with the clamps 90, if desired. Also, spacing shims or washers can also be used, if desired.

In operation, as the connecting rod 78 moves with the crank shaft, the generally cylindrical pin 96 will be moved within the space defined by the recess 82 and the recess 92. In this embodiment, as in the previously described embodiment, heat and wear of the working parts is substantially reduced, and provision is made for perfect balancing of the piston by the addition or subtraction of weight at the rib area. Also, some allowance for end play of the crank shaft is provided for by virtue of the space 98 at the ends of the pin 96. At the same time, the pin 96 fits rather closely within the recess 82 and 92 so that piston slap and the like caused by looseness in the mounting of the piston on the connecting rod is eliminated.

As will be evident to those skilled in the art. various modifications of this invention can be made, or followed, in the light of this description and discussion, without departing from the spirit of the disclosure or the scope of the claims.

What is claimed is:

1. A mounting for a piston and a connecting rod in an internal combustion engine comprising, in combination, a piston, said piston being hollow at one end and closed at the other end, the closed end of said piston having on the inside thereof an integrally formed elongated socket mounting means having a centrally located recess, said recess defining substantially a semi-cylindrical inner space having the ends thereof rounded, an enlarged relatively short semi-cylindrical recess centrally located on said socket mounting means and communicating with the center portion of said first-named recess, a plurality of radially extending and equally spaced ribs formed on the inside surface of said closed end of said piston to provide for support and heat dissipation, an elongated clamp means, said clamp means having a centrally located semi-cylindrical recess therein, said recess in said clamp means being rounded at the end, and another clamp means, said last-named clamp means being the mirror image of said first-named clamp means when mounted, said clamp means being mountable together on said socket mounting means and located thereon so that said recesses in said socket mounting means and said clamp means define a substantially cylindrical space, mounting bolts passing through said clamp means to secure said clamp means in position on said socket mounting means, said device being constructed and adapted so that the end of a connecting rod can be received in said relatively short cylindrical space in said socket mounting means, and a pin in said connecting rod can be positioned in said cylindrical space and substantially fill said space.

2. A mounting for a piston and a connecting rod comprising, in combination, a piston, said piston being hollow at one end and closed at the other end, the closed end of said piston having on the inside surface thereof elongated socket mounting means, an elongated generally semi-cylindrical recess in said socket mounting means, an enlarged relatively short semi-cylindrical recess centrally located on and communicating with said first-named recess, ribs formed on the inside surface of said closed end of said piston, two elongated clamp means, each of said clamp means having a generally semi-cylindrical recess formed therein on one surface thereof, said clamp means being mounted on the inside surface of said piston in mirror image relation to form with said recesses in said piston a generally cylindrical recess, said device being constructed and adapted so that the end of a connecting rod with a generally cylindrical pin thereon can be received in said recesses with said rod projecting therefrom between said clamp means.

3. A mounting for a piston and a connecting rod comprising, in combination, a piston, socket mounting means on one end of said piston, a centrally located recess in said socket mounting means, said recess defining a semi-cylindrical space, said recess opening into a larger semi-cylindrical recess, said last-named recess being centrally located on said first-named recess, clamp means, said clamp means having a recess therein forming when mounted a continuation of said first-named recess, means mounting said clamp means on said socket mounting means, said device being constructed and adapted so that the end of a connecting rod having a generally cylindrical pin thereon can be received in said recesses with said rod projecting through said clamp means.

References Cited in the file of this patent

UNITED STATES PATENTS

| | | |
|---|---|---|
| 1,332,760 | Saitta | Mar. 2, 1920 |
| 1,419,736 | Johnston | June 13, 1922 |
| 1,500,010 | Smith et al. | July 1, 1924 |
| 1,612,047 | Owens | Dec. 28, 1926 |
| 2,317,429 | Armstrong | Apr. 27, 1943 |
| 2,380,907 | Hall | July 31, 1945 |
| 2,830,860 | Sampietro | Apr. 15, 1958 |